United States Patent
Mueller et al.

(10) Patent No.: US 7,024,319 B2
(45) Date of Patent: Apr. 4, 2006

(54) DEVICE FOR DETERMINING AND/OR MONITORING A PROCESS PARAMETER

(75) Inventors: Alexander Mueller, Maulburg (DE); Roland Mueller, Steinen (DE); Stefan Probst, Weil am Rhein (DE)

(73) Assignee: Endress & Hauser GmbH & Co. KG, Maulburg (DE)

( * ) Notice: Subject to any disclaimer, the term of this patent is extended or adjusted under 35 U.S.C. 154(b) by 0 days.

(21) Appl. No.: 10/898,188

(22) Filed: Jul. 26, 2004

(65) Prior Publication Data

US 2005/0075844 A1    Apr. 7, 2005

Related U.S. Application Data

(60) Provisional application No. 60/489,941, filed on Jul. 25, 2003.

(30) Foreign Application Priority Data

Jul. 17, 2003    (DE) ................. 103 32 763

(51) Int. Cl.
*G01F 17/00*    (2006.01)
*G01F 23/00*    (2006.01)
*G01L 7/00*    (2006.01)
*G01N 11/00*    (2006.01)

(52) U.S. Cl. ............................................ 702/55

(58) Field of Classification Search ............... 702/22, 702/30–32, 45, 47, 50, 55, 100, 113, 182–185
See application file for complete search history.

(56) References Cited

U.S. PATENT DOCUMENTS

| 5,802,859 | A | * | 9/1998 | Zugibe ..................... 62/125 |
| 6,037,857 | A | | 3/2000 | Behrens et al. ......... 340/310.03 |
| 6,456,057 | B1 | | 9/2002 | Weber et al. ............ 324/76.52 |
| 6,476,520 | B1 | * | 11/2002 | Bohm et al. ............... 307/104 |

FOREIGN PATENT DOCUMENTS

| DE | 44 39 879 | | 2/1996 |
| DE | 19719730 | * | 10/1998 |
| EP | 1 043 640 | | 10/2000 |
| EP | 1043640 | * | 10/2000 |
| EP | 1 102 378 | | 5/2001 |
| EP | 1102378 | * | 5/2001 |
| WO | 2005/013017 | * | 2/2005 |
| WO | 2005/015329 | * | 2/2005 |

* cited by examiner

*Primary Examiner*—Michael Nghiem
(74) *Attorney, Agent, or Firm*—Bacon & Thomas

(57) ABSTRACT

A device for determining and/or monitoring a physical or chemical process variable, with at least one electrical, electronic and/or programmable electronic component, which fulfills at least one safety-relevant protective function, wherein the safety-relevant protective function satisfies a given safety standard and is developed according to the given safety standard.

12 Claims, 2 Drawing Sheets

DEVICE FOR DETERMINING AND/OR MONITORING A PROCESS PARAMETER

FIELD OF THE INVENTION

The invention relates to a device and a method for determining and/or monitoring a physical or chemical process variable.

BACKGROUND OF THE INVENTION

For determining physical, measured variables, widely varying types of sensors are used, which can be based on very different, physical measuring principles. Thus, for instance, the fill level of a fill substance in a container can be measured on the basis of the travel time of ultrasonic waves or electromagnetic waves, especially microwaves, reflected from the surface of the fill substance. In the case of microwaves, these are either radiated freely into the container in the direction of the surface of the fill substance, or the microwaves are guided into the container along a conductive element. Besides the use of these principles of measurement, capacitive and radiometric measuring methods are also used for fill level measurement.

For detecting the limit level of a fill substance in a container, preferably the resonance frequency of an oscillating rod, or of an oscillatable structure constructed from a plurality of rods, is evaluated. In the case of this measuring method, use is made of the effect that the resonance frequency changes, depending on whether the oscillating rods oscillate freely or else are in contact with the fill substance. Corresponding measuring devices are available from the assignee of the present application in many possible variants.

SUMMARY OF THE INVENTION

An object of the invention is to provide a cost-favorable device and a method for fulfilling given safety requirements.

The object is achieved in that at least one electrical, electronic and/or programmable electronic component is provided, which fulfills at least one safety-relevant protective function, wherein the safety-relevant protective function satisfies a given safety standard and is developed according to the given safety standard.

A goal of the invention is thus especially to provide a field device with plural functions, wherein at least one of the functions is a safety-relevant function. Thus at least one safety-relevant function is so developed that, at least for this important safety function, the developmental guidelines corresponding to a predetermined safety standard are followed. The safety standard is e.g. IEC 61508.

To give a concrete example, the device for determining and/or monitoring a physical or chemical process variable can be a device for continuously measuring and/or monitoring the fill level of a fill substance in a container; the protective function can be a limit switch function. The fill level measuring device can be, for example, a radiometric measuring device. The safety-relevant, protective function then assures, especially, that a maximum fill level in a container is recognized with certainty and is subsequently not exceeded. For instance, if the fill substance is an explosive or poisonous material, then a maximum fill level must never be exceeded, in order that the dangerous fill substance not overflow from the container.

Especially advantageous according to the invention is that all components that do not have to fulfill safety-relevant functions, do not need to be developed according to these safety guidelines. With reference to the above-related case, this means that all components of the fill level measuring device in the area of the continuous measurement up to shortly before reaching the maximum permissible value of the fill level do not have to fulfill a safety standard or be developed according to a safety standard; only the protective function fulfills the safety standard. Based on this recognition, it becomes possible, subsequently, to modify measuring devices that were not constructed according to safety-relevant guidelines, such that at least the protective function does fulfill the requisite safety standard. In this way, a qualification of the measuring device for use in vulnerable areas can be achieved.

According to an advantageous further development of the device of the invention, the protective function, for instance the limit switch function, is embodied with respect to hardware and/or with respect to software. "With respect to hardware" means e.g. that the components of the protective function, e.g. the limit switch function, are redundantly embodied. Additionally, it is provided that the protective function, e.g. the limit switch function, is embodied with diversity, i.e. the redundant components come from different manufacturers, whereby systematic malfunctioning of the components can be avoided with high probability. By these measures—alone or in combination—the highest of safety requirements can be fulfilled. In the case of software, diversity means that the programs are created by different programming firms and different programmers. Also in this way, the elimination of systematic errors is achieved with a probability bordering on certainty.

In order to assure that the information does not get corrupted on the transmission path e.g. to a remote control station, a digital bus system is provided, which satisfies a given safety standard and/or is developed according to the given safety standard. This assures that the data from the measuring device are transmitted also correctly to the remote control station.

In an advantageous further development of the device of the invention, it is provided that the protective function, e.g. the limit switch function, is derived from an analog current signal.

Another focus of the invention is directed toward parametering, or calibrating, as the case may be, a measuring device, which satisfies a given safety standard, with a parametering and/or calibrating tool, which itself was not developed according to a given safety standard or which does not fulfill a given safety standard. The tool can be a local display, or a PC, connected to the measuring device. Particularly it is a goal of the invention to assure a safe parametering of a measuring device, e.g. the radiometric measuring device FMG 60 of the assignee, of the present application under the requirements of the standard IEC61508. A preferred tool is the ToF-Tool available from the assignee of the present application. Other parametering tools are AMS, PDM, etc.

Now, problematic is that e.g. the ToF-Tool was not developed under the SIL-Standard IEC61508. In general, it can be said, that PC-based tools, due to the lack of safety of the PC's, can generally not be considered as safe. Consequently, the invention provides a device and a method that assures that the parameters are indeed present and effective in the measuring device in the way defined by the user on the basis of the application.

Since the measuring device cannot on its own initiative check which parameters are correct or in error, a fail-safe supervision is required from the user. The invention provides a device and a method by which first to parameter with a tool that does not fulfill a safety standard and then to monitor with this tool. Additionally, a signal path is provided, over which at least the analog current signal of the protective function, e.g. the limit switch function, is transmittable from the first unit into the second unit, wherein the first unit satisfies the given safety standard and has been developed according to the given safety standard and wherein the signal path and/or the second unit do/does not satisfy the given safety standard. Furthermore, a control/evaluation unit is provided, which transmits the protective function, e.g. the limit switch function, back from the second unit into the first unit developed according to the given safety standard. The protective function, e.g. limit switch function, transferred from the first unit, and the protective function, e.g. limit switch function, read back into the first unit, are then recognizable and distinguishable for a user.

Considered especially advantageous is the embodiment wherein an input unit, an operating tool and/or a display are/is provided, via which the device can be parametered and/or calibrated. Especially, a method of the invention will be presented below, with which it is possible to perform the calibration and/or parametering of a protective function by means of a calibrating and parametering tool, which was not developed according to a safety standard, such that the safety standard nevertheless remains assured.

According to an advantageous further development of the device of the invention, a switching element is provided, via which the protective function, e.g. the limit switch function, can be switched in, or out.

The object is achieved with respect to the method for determining and/or monitoring a process variable, in that a value for at least one process parameter is defined via a selection menu at a second unit, which was not developed according to a safety standard, or at a unit, which does not satisfy a safety standard; the selected value of the process parameter is transmitted to a first unit, which was developed according to a safety standard and which fulfills a safety-relevant protective function; then, the selected process parameter is transmitted from the first unit back to the second unit; finally, the parameter is stored in the first unit, when the value of the process parameter displayed at the second unit agrees with the selected value of the process parameter and is confirmed by the user as correct.

Preferably, the selected value of the process parameter is locked in the first unit via the input of a PASSWORD. A stored process parameter can subsequently be edited and changed only by input of the appropriate PASSWORD.

The invention will now be explained in greater detail on the basis of the drawings, whose figures show as follows:

DESCRIPTION OF THE PREFERRED EMBODIMENTS

Figure 1:
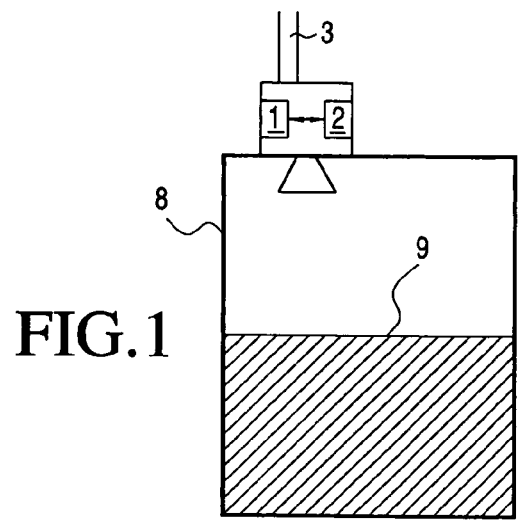
FIG. 1—is a first embodiment of the device of the invention.

FIG. 1 shows a first embodiment of the device of the invention for determining and/or monitoring a physical or chemical process variable. The measuring device has at least one electrical, electronic and/or programmable electronic component 1, which perform/performs the at least one safety-relevant protective function. The safety-relevant protective function satisfies a given safety standard, or it is developed corresponding to the given safety standard. Preferably, the safety-relevant protective function is a limit switch function. Illustrated is a radar measuring device; however, it can, of course, be a radiometric measuring device, or a vibration detector, designed for density, viscosity and limit level measurement. This device is used in conjunction with a container 8 including a fill material 9.

Figure 2:
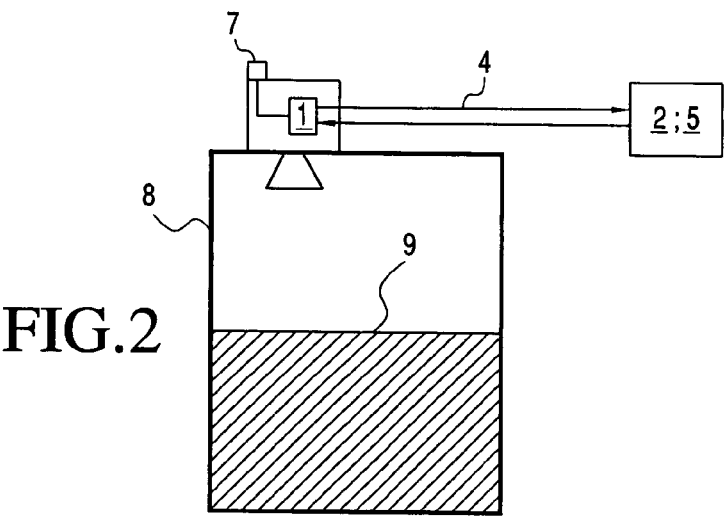
FIG. 2—is a second embodiment of the device of the invention.

FIG. 2 shows a second embodiment of the device of the invention. Between a first unit and a second unit, a signal path 4 is provided, over which at least the analog current signal of the protective function, e.g. the limit switch function, is transmittable from the first unit 1 into the second unit 2. The first unit 1 satisfies a given safety standard, or it is developed according to the given safety standard. The signal path 4 and/or the second unit 2 do/does not satisfy the safety standard. In the illustrated case, a control/evaluation unit 5 is associated with the second unit 2 and transmits the protective function, e.g. the limit switch function, from the second unit 2 back into the first unit developed according to the given safety standard. The protective function, e.g. limit switch function, transmitted from the first unit 1 and the protective function, e.g. limit switch function, read back from the second unit 2 into the first unit 1 are recognizable and distinguishable for the user. Mounted on the first unit 1 is a switch 7, with which the protective function can be switched on and off.

Figure 3:
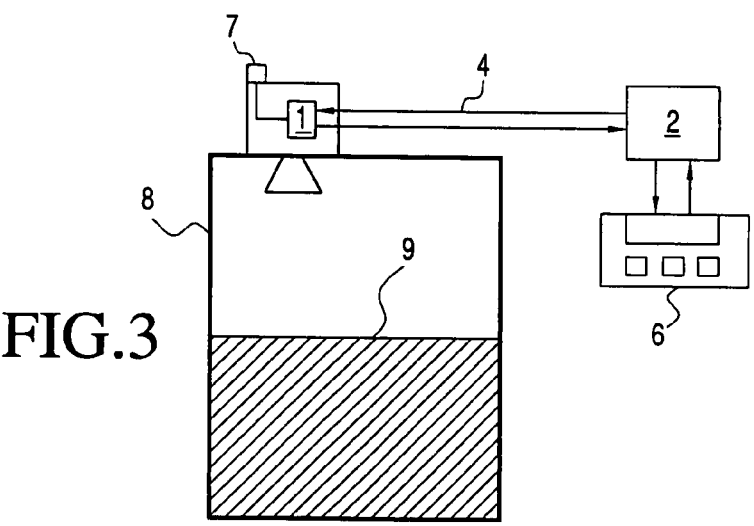
FIG. 3—is a third embodiment of the device of the invention.

FIG. 3 shows a third embodiment of the device of the invention. A selected value for at least one process parameter is defined via a selection menu at a second unit 2, 6 not developed according to a safety standard, or at a unit 2, 6 not fulfilling a safety standard. The selected value of the process parameter is transmitted to a first unit 1, which was developed according to a safety standard and which fulfills a safety-relevant protective function, with the selected process parameter then being transmitted from the first unit 1 back to the second unit 2. The parameter is stored in the first unit, when the value of the process parameter displayed at the second unit 2, 6 agrees with the selected value of the process parameter. The examination occurs by intervention of the user. The first unit 1 and the second unit 2 are connected together via a data connection, e.g. via a bus system 4. The data with respect to the process parameter are exchanged via the bus system 4. The bus system can, but does not have to, be developed according to a safety standard. It is not required in connection with the invention that the bus system 4 fulfill a given safety standard.

Figure 4:
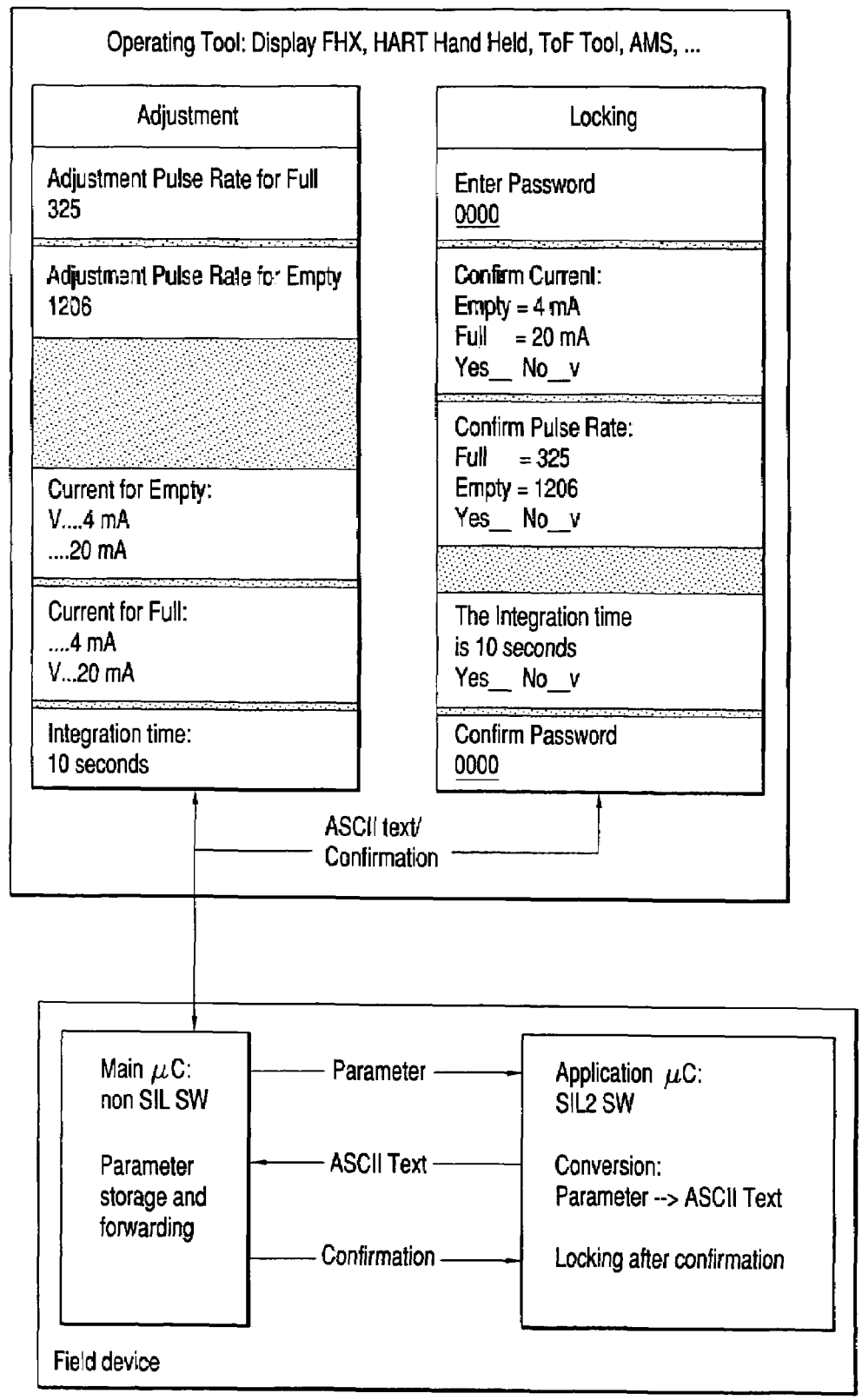
FIG. 4—is a flow diagram showing the manner in which the method of the invention works.

FIG. 4 shows the data flow for a safe parametering of a measuring device. In a first step, all parameters are first defined as usual by the user using at least one corresponding selection menu. These parameters are sent from the display, or from the particular operating tool being used, into the device. The operating tool, or PC, does not fulfill the given safety standard.

The parameters are stored in the measuring device and/or in the operating tool/PC. If, for reasons of functional safety, the device is to be locked, then the parameters can be transformed in the measuring device into a text using software SW developed according to a given safety standard, e.g. the IEC61508.

For locking, first a PASSWORD is entered. This input sets certain parameters, such as filter, etc., to default values, which can not be edited by the user when using the measuring device as e.g. a SIL2 device—thus a device satisfying a given safety standard. The safety-relevant parameters are thus secured against involuntary or unauthorized changes.

Thereafter, the safety relevant and editable parameters (now in text form) are transmitted back again to the display, or operating tool, and appear on the display. The user must confirm every parameter separately or in groups. To do this, the user changes the selection symbol "v" from no to yes and confirms with "Enter". With this confirmation, the parameter or the parameter group is pre-locked. At the end of the query sequence, the PASSWORD must be re-entered. If the PASSWORD is entered correctly in the confirmation, then all safety relevant and editable parameters are finally locked in the device. With this, the PASSWORD is no longer observable. It is indicated by XXXX.

An unlocking is then only possible with the correct PASSWORD. Here, it is sufficient to enter the PASSWORD only once. The non-editable parameters do not, moreover, need to be confirmed.

The number of separate confirmations without input of the PASSWORD can e.g. be at least three. At a maximum, there should not be more than ten confirmations. With a larger number, there is the danger that the user would blindly confirm without reading. That would cancel the safety effect.

For the case where the PASSWORD is forgotten, a total reset is provided. With total reset, all parameters are set to their default values. The PASSWORD is erased. Requirement for this procedure is that the measuring device goes on error, or residual, current following a total reset, that this state of the output current is safely monitored.

The fact that the parameters are sent, in the embodiment illustrated here, via a main processor to an application processor, is an idiosyncracy of the radiometric measuring device FMG60 being applied. The already present platform of the FMG60 is to be maintained. In general, the method is valid also for a one-processor solution, or the main processor is likewise developed under the provisions of the given safety standard, e.g. the IEC61508. Then, the transmission and changing of the entered parameters into an ASCII text by the application µC is not required.

The main advantage of this procedure lies in the independence of the choice of operating tools. Since the entire safety-relevant software is located in the measuring device, the operating tool does not have to be considered further in the safety concept. The operating tool must simply be able to show completely the text to be confirmed.

If a number of blocks not developed under a safety standard (e.g. a bus system not yet certified and corresponding to the given safety standard) are arranged between a function block responsible for the safety-relevant function and a unit evaluating the safety-relevant signal, then a safe feedback of the safety-relevant signal is necessary.

The method of the invention expands the combination possibilities of components and functions for the user of a measuring device, without the user being compelled to prove in the case of safety-relevant applications the operational reliability of the total system. Only the safety-relevant functions have been produced in a safe design process and can be seen as isolated from remaining, non-safety-relevant functions.

What is claimed is:

1. A method for determining or monitoring a process variable, comprising the steps of:
    defining a value for at least one process parameter via a selection menu at a second unit not developed according to a safety standard or at a unit not satisfying a safety standard; and
    transmitting the selected value of the process parameter to a first unit developed according to a safety standard and fulfilling a safety-relevant protective function, wherein the selected process parameter is transmitted from the first unit back to a second unit; and
    storing the parameter in the first unit, when the value of the process parameter displayed at the second unit agrees with the selected value of the process parameter.

2. The method as claimed in claim 1, wherein:
    the selected value of the process parameter is locked in the first unit via a PASSWORD input.

3. The method as claimed in claim 1, wherein:
    a stored process parameter is edited and changeable via a PASSWORD input.

4. A device for determining or monitoring a physical or chemical process variable of a fill substance in a container having:
    at least one electrical, electronic and/or programmable electronic component, which fulfills at least one safety-relevant protective function, wherein:
    the safety-relevant protective function satisfies a given safety standard and is developed according to the given safety standard;
    a signal path is provided, over which at least the analog current signal of the protective function, or of the limit switch function, as the case may be, is transmittable from a first unit into a second unit of said at least one electrical, electronic, or programmable electronic component;
    said first unit satisfies the given safety standard and is developed under the given safety standard;
    said signal path or said second unit does not satisfy the safety standard;
    a control/evaluation unit is provided, which transmits the protective function, or the limit switch function, as the case may be, from said second unit back into said first unit developed under the given safety standard; and
    the protective function, or limit switch function, as the case may be, transmitted from said first unit and the protective function, or said limit switch function, read back into said first unit are recognizable and distinguishable.

5. The device as claimed in claim 4, wherein:
    the device is a device for the continuous measurement or monitoring of the fill level of the fill substance in the container; and
    the protective function is a limit switch function.

6. The device as claimed in claim 5, wherein:
    said limit switch function is accomplished by hardware and/or software.

7. The device as claimed in claim 4, wherein:
    the protective function, or said limit switch function, as the case may be, is embodied redundantly.

8. The device as claimed in claim 4, wherein:
    the protective function, or said limit switch function, as the case may be, is embodied with diversity.

9. The device as claimed in claim 4, further having:
    a digital bus system for transmitting the protective function said bus system satisfying a given safety standard and is developed under the given safety standard.

10. The device as claimed in claim 4, wherein:
    the protective function, or said limit switch function, as the case may be, is derived from an analog current signal.

11. The device as claimed in claim 4, further having:
    an input unit;
    an operating tool and/or a display, by way of which the device can be parametered and/or calibrated.

12. The device as claimed in claim 4, further having:
    a switch element, by way of which the protective function, or said limit switch function, as the case may be, can be switched on or off.

* * * * *